United States Patent [19]

Harada et al.

[11] Patent Number: 4,829,579

[45] Date of Patent: May 9, 1989

[54] APPARATUS FOR CONFIRMING AND REPORTING THE OPERATING CONDITIONS OF A CHAIN SAW OR THE LIKE

[75] Inventors: Ryuzo Harada; Shigeo Take, both of Kanagawa, Japan

[73] Assignee: Oppama Kogyo Kabushiki Kaisha, Yokosuka, Japan

[21] Appl. No.: 916,298

[22] Filed: Oct. 7, 1986

[51] Int. Cl.⁴ .................................................. G10L 5/02
[52] U.S. Cl. ................................ 381/51; 123/198 DC
[58] Field of Search ........ 123/198 D, 198 DC, 179 B, 123/179 BG; 381/51

[56] References Cited

U.S. PATENT DOCUMENTS

| | | | |
|---|---|---|---|
| 4,428,685 | 1/1984 | Lemelson et al. | 381/51 X |
| 4,494,497 | 1/1985 | Uchida et al. | 123/179 B |
| 4,542,718 | 9/1985 | Hurner | 123/198 D X |
| 4,648,364 | 3/1987 | Wills | 123/198 D |

Primary Examiner—William M. Shoop, Jr.
Assistant Examiner—Marc S. Hoff
Attorney, Agent, or Firm—Bauer & Schaffer

[57] ABSTRACT

Confirmation of the existance of the proper operating conditions of a power tool is obtained by providing confirmation sensing means for sensing and confirming inspection and verification of the appropriate condition of each one of a plurality of preset operating conditions by the user, a confirmed state judging means for receiving the output of the completed confirmation sensing means and judging what operating conditions have been completely inspected and verified; a confirmation instructing means for informing the user of those operating conditions yet to be inspected and verified in response to the output of the confirmed state judging means; and, switching means for receiving the output of the confirmed state judging means and thereby allowing energization of the igniting circuit of the engine only after confirmation of all the preset operating conditions are completed and met.

9 Claims, 3 Drawing Sheets

4,829,579

APPARATUS FOR CONFIRMING AND REPORTING THE OPERATING CONDITIONS OF A CHAIN SAW OR THE LIKE

FIELD OF THE INVENTION

This invention relates to an apparatus for confirming and reporting the operating conditions of a chain saw, mower, sprinkler, duster or sterilizer having an internal combustion engine (which unit shall be merely called "a chain saw or the like" hereinafter).

That is to say, the present invention relates to an apparatus wherein such conditions required for the normal operation of a chain saw or the like as whether the fuel is contained and whether the lubricating oil is contained (which conditions shall be merely called "operating conditions" hereinafter) are confirmed by the user or the like in advance before starting the operation and, when such confirmation is failed, the operation of the chain saw or the like will be stopped.

BACKGROUND OF THE INVENTION

In a chain saw or the like, before starting the operation, it will be required of the user or the like to confirm such several operating conditions as whether the fuel is contained, whether the lubricating oil is contained and whether the tension of the chain is proper.

However, in the conventional chain saw or the like, there is provided no means of warning the user or the like to confirm the operating conditions and therefore such confirmation is likely to be failed. Even if the confirmation is failed, the operation will be possible. Therefore, there have been defects that, for example, in case there is no lubricating oil or in case the tension of the chain is loose, during the operation, the internal combustion engine will seize or the chain will be removed to be dangerous.

BRIEF SUMMARY OF THE INVENTION

The present invention is to provide an apparatus which warns the user or the like to confirm the operating conditions of a chain saw or the like before starting and will prevent the operation of the chain saw or the like when the user or the like fails to confirm the operating conditions.

Therefore, the present invention comprises a completed confirmation sensing means of sensing the completed confirmations of the respective operating conditions by the user or the like, a confirmed state judging means of receiving the output of the completed confirmation sensing means and thereby judging what operating conditions have been completely confirmed, a confirmation instructing means of informing the user or the like of the operating conditions to be confirmed in response to the output of the confirmed state judging means and a switching means of receiving the output of the above mentioned confirmed state judging means and thereby energizing the igniting circuit of the engine only after the confirmations of all the preset operating conditions are completed.

According to the present invention of the above mentioned formation, first of all, at the time of starting the engine, the confirmation of the first operating condition is instructed to the user or the like from the confirmation instructing means.

In the case, when the confirmed state judging means having received the output of the completed confirmation sensing means judges that the confirmation of the above mentioned first operating condition has not yet been completed, the confirmation of the first operating condition will be further instructed to the user or the like from the confirmation instructing means. When the confirmation of the first operating condition is judged to have been completed, the confirmation of the second operating condition will be instructed to the user or the like from the confirmation instructing means.

When the above operations are repeated in the same manner, the user or the like will confirm in turn the respective operating conditions.

Thus, only when the confirmed state judging means judges that the confirmations of all the preset operating conditions have been completed, the switching means having received the output of the confirmed state judging means will energize the igniting circuit of the engine.

As in the above, according to the present invention, before starting the operation of a chain saw or the like, the operating conditions are confirmed by the user or the like and, when the confirmation is failed, the operation of the chain saw or the like will be able to be prevented. Therefore, there is no fear that, during the operation, the internal combustion engine will seize or the chain will be removed to be dangerous. Thus, the invention is very advantageous to the safety.

BREIF DESCRIPTION OF THE DRAWINGS

DETAILED DESCRIPTION OF THE INVENTION

Figure 1:
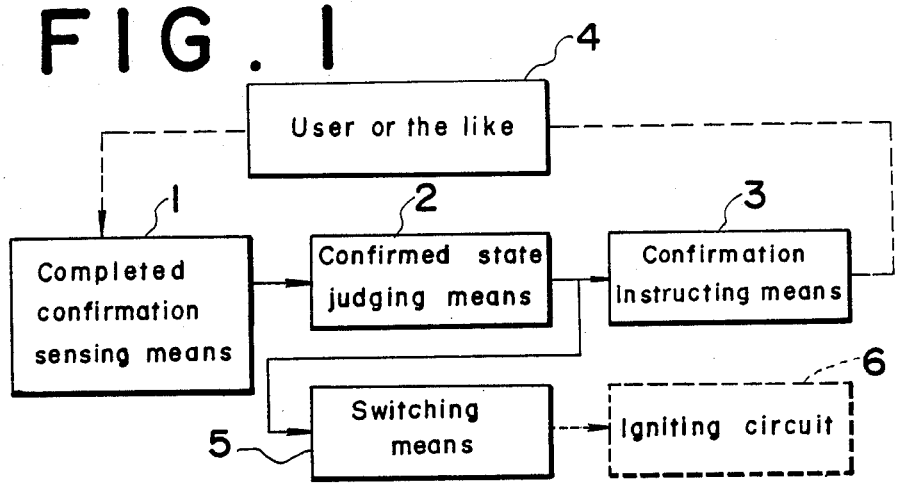
FIG. 1 is a block diagram showing the formation of the present invention.

The fundamental formation of the present invention shall be described with reference to FIG. 1.

A confirmed state judging means 2 is to receive the output of a completed confirmation sensing means sensing the completed confirmations of the respective operating conditions by the user or the like and to thereby judge what operating conditions have been completely confirmed. A confirmation instructing means 3 is to inform the user or the like 4 of the operating conditions to be confirmed in response to the output of the above mentioned confirmed state judging means. A switching means 5 is to receive the output of the above mentioned confirmed state judging means and to thereby energize the igniting circuit of the engine only after the confirmations of all the preset operating conditions are completed.

According to the present invention of the above mentioned formation, first of all, at the time of starting the engine, the confirmation of the first operating condition is instructed to the user or the like 4 from the confirmation instructing means 3.

In this case, when the confirmed state judging means 1 having received the output of the completed confirmation sensing means judges that the confirmation of the above mentioned first operating condition has not yet been completed, the confirmation of the first operating condition will be further instructed to the user or the like 4 from the confirmation instructing means 3.

When the confirmation of the first operating condition is judged to have been completed, the confirmation of the second operating condition will be instructed to the user or the like from the confirmation instructing means 3.

When the above operations are repeated in the same manner, the user or the like 4 will confirm in turn the respective operating conditions.

Thus, only when the confirmed state judging means 2 judges that the confirmations of all the preset operating conditions have been completed, the switching means 5 having received the output of the confirmed state judging means will energize the igniting circuit 6 of the engine.

As in the above, according to the present invention, before starting the operation of a chain saw or the like, the operating conditions are confirmed by the user or the like and, when the confirmation is failed, the operation of the chain saw or the like will be able to be prevented. Therefore, there is no fear that, during the operation, the internal combustion engine will seize or the chain will be removed to be dangerous. Thus, the invention is very advantageous to the safety.

The present invention shall be described in detail in the following with reference to the embodiments shown in the drawings.

Figure 2:
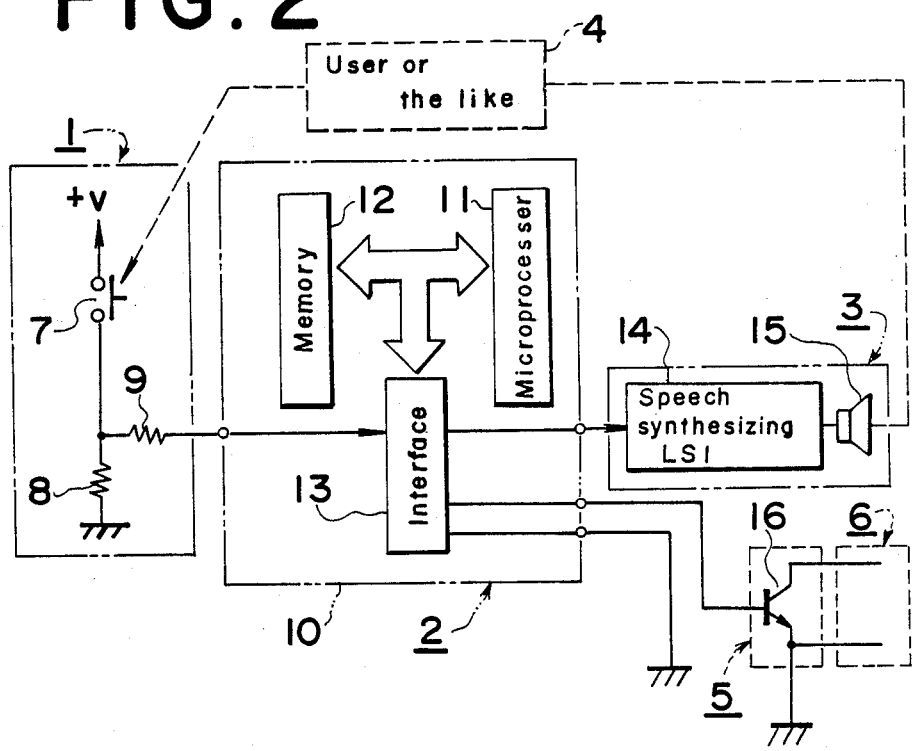
FIG. 2 is an electric circuit diagram showing an embodiment.
Figure 3:
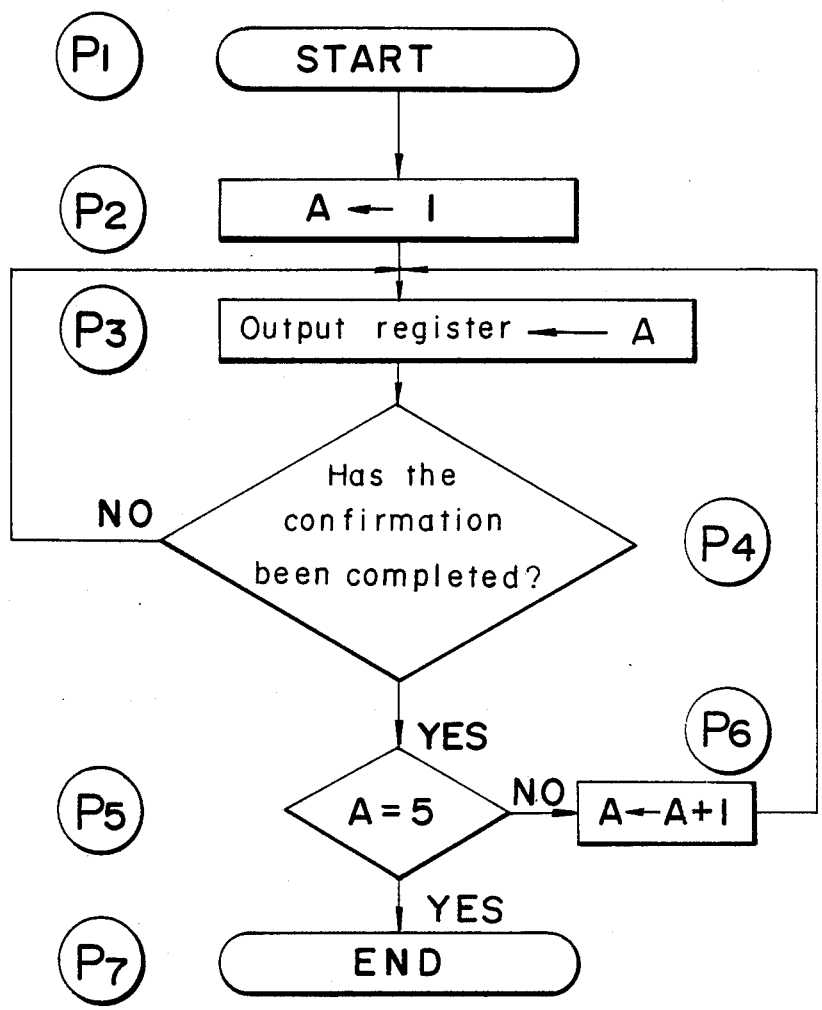
FIG. 3 is a flow chart for judging the confirmed state of the operating conditions.

FIG. 2 shows an embodiment of the present invention.

In FIG. 2, the reference numeral 1 represents a completed confirmation sensing means of sensing the completed confirmations of the respective operating conditions by the user or the like. The completed confirmation sensing means 1 is formed of a nonlocked type switch 7 and resistances 8 and 9 connected with one another as illustrated and is connected to an interface 13 of a microcomputer 10. That is to say, when the user or the like 4 has completed the confirmations of the operating conditions and pushes the switch 7, a completed confirmation signal will be fed to the interface 13. By the way, the switch 7 may be provided to correspond to each of the respective operating conditions or may be one.

The reference numeral 2 represents a confirmed state judging means, for example, by using a microcomputer 10, comprising mostly a microprocessor (central operating device) 11, a memory (memorizing device) 12 and an interface (input and output signal processing circuit) 13 into which completed confirmation signals are to be put as described above.

Further, the output of the interface 13 is to be put into the confirmation instructing means 3 and switching means 5.

The confirmation instructing means 3 is to inform the user or the like of the operating conditions to be confirmed and comprises a speech synthesizing LSI 14 and a speaker 15. The speech synthesizing LSI has memorized several kinds of preset speech informations and is to receive speech selecting signals and speech generating signals and to generate predetermined speechs through the speaker 15. In the present invention, such speech informations corresponding to the operating conditions to be confirmed as, for example, of "Is there the fuel?" and "Is there the lubricating oil?" are set. That is to say, in the case shown in FIG. 2, the outputs of the above-mentioned interface 13 are used as the speech selecting signals and speech generating signals of the speech synthsizing LSI 14 to inform the user or the like 4 by speeches of the operating conditions to be confirmed in response to the result of the judgment of the confirmed state.

By the way, the confirmation instructing means 3 may use as well such indicator as a lamp or liquid crystal indicator or may use only such indicator.

The switching means 5 is to receive the output of the above-mentioned interface 13 and to thereby energize the igniting circuit 6 of the engine only after the confirmations of all the preset operating conditions are completed. In the case shown in FIG. 2, a transistor 16 is used. That is to say, in the transistor 16, for example, an emitter and collector are connected in series with the igniting circuit 6 so that the conduction and nonconduction may be controlled by the output of the interface 13. Therefore, when the transistor 16 is nonconductive, the igniting circuit 6 will not operate and, as a result, the operation of the chain saw or the like will be prevented.

By the way, the switching means 5 is not limited to be of a transistor but may be such electronic switch or relay as of a thyristor.

The contents of confirmation instructions and the states of the transistor 16 corresponding to the outputs of the confirmation judging means 2, that is, the outputs of the interface 13 determined by the values of the output register are made, for example, as shown in the following table:

| Values of the output register | Contents of the confirmation instructions | States of the transistor |
|---|---|---|
| 1 | Is there the fuel? (First operating condition) | OFF |
| 2 | Is there the lubricating oil? (Second operating condition) | OFF |
| 3 | Is the tension of the chain proper? (Third operating condition) | OFF |
| 4 | Is the chain sharpened well? (Fourth operating condition) | OFF |
| 5 | (None) | ON |

Further, a flow chart for carrying out the judgment of the confirmed state of the operating conditions is shown in FIG. 2. By the way, in the chart, $P_1$ to $P_7$ represent the respective steps of the flow chart.

This judgment is carried out by being initially set at the time of starting the engine or, for example, at the time of putting in a current source. First of all, at $P_2$, (1) is memorized in the register A and, at $P_3$, the contents of the register A are moved to the output register. Then, at $P_4$, whether the confirmation has been completed or not, that is, whether the switch 7 is ON or not is judged. If this confirmation has not been completed, $P_3$ and $P_4$ will be repeated. If this confirmation has been completed, at $P_5$, whether all the confirmations have been completed or not will be judged. If all the confirmations have been completed, at $P_6$, the addition of (1) to the original contents of the register A will be made the contents of the register A and the process will return to $P_3$. If all the confirmations have been completed, at $P_7$, the judgment will be completed.

According to the present invention of the above-mentioned formation, at the time of starting the engine, first of all, a speech of "Is there the fuel?" will be issued from the speaker 15 to instruct the user or the like 4 to confirm the first operating condition.

In such case, unless the user or the like 4 sets the switch 7 ON, the speech of "Is there the fuel?" will continue to be issued from the speaker 5.

If the user or the like 4 sets the switch 7 ON, a speech of "Is there the lubricating oil?" will be issued from the speaker 15 to instruct the user or the like 4 to confirm the second operating condition.

The above operations are repeated in the same manner so that the user or the like 4 may confirm in turn the respective operating conditions.

Thus, in case a speech of "Is the chain sharpened well?" is issued from the speaker 15 to instruct the user or the like to confirm the last operating condition, if the user or the like 4 sets the switch 7 ON, the issue of the speech from the speaker 15 will be stopped and the transistor 16 will be conductive for the first time. As a result, for the first time, at this time point, the igniting circuit 6 will be energized and the chain saw or the like will be able to be started. Thereafter, the transistor will remain conductive.

Figure 4:
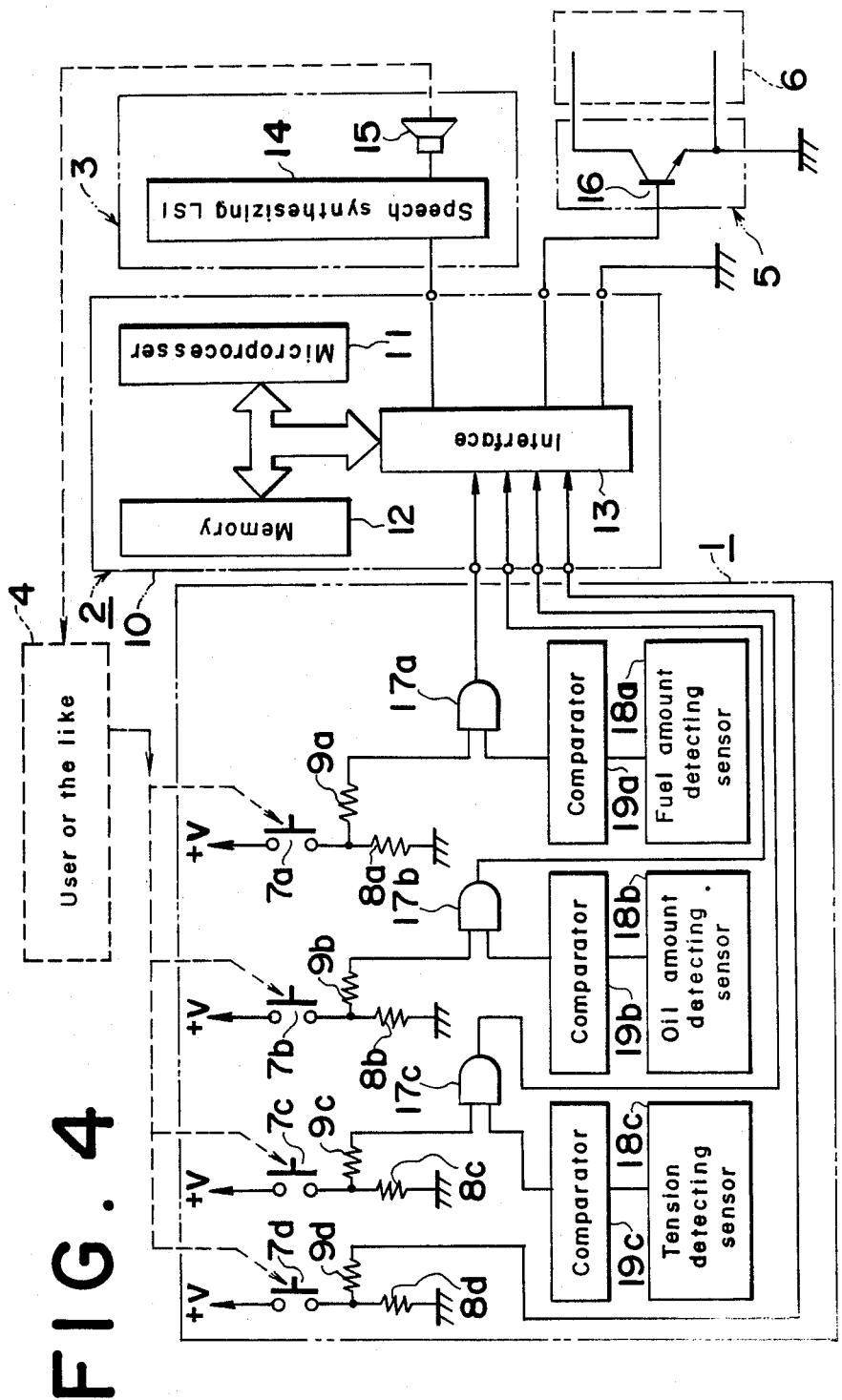
FIG. 4 is an electric circuit diagram showing another embodiment.

FIG. 4 shows another embodiment different from the embodiment shown in FIG. 2 in the formation of the completed confirmation sensing means 1.

That is to say, nonlocked type switches 7a, 7b, 7c and 7d to be pushed by the user or the like when the confirmations of the operating conditions have been completed are provided to correspond to the respective operating conditions. The switch 7a corresponds to the confirmation of the fuel. The switch 7b corresponds to the confirmation of the lubricating oil. The switch 7c corresponds to the confirmation of the tension of the chain. The switch 7d corresponds to the confirmation of the sharpness of the chain.

The switch 7a is connected to resistances 8a and 9a as illustrated and further to one input end of an AND-gate 17a.

The output of a fuel amount detecting sensor 18a for detecting the fuel amount as an analogue signal is connected to the other input end of the AND-gate through a comparator 19a which compares the analogue signal with the signal corresponding to the required amount of the fuel, judges whether the fuel is contained or not and puts out the result. Needless to say, in case it is to be detected as a digital signal that the required amount of the fuel is not contained, the above mentioned comparator 19a will be unnecessary.

The output of the AND-gate 17a is to be put into the interface 13 as a completed confirmation signal of one operating condition, that is, the fuel.

The above formation is the same also of the switches 7a and 7c, resistances 8b, 9b, 8c and 9c, AND-gates 17b and 17c, oil amount detecting sensor 18c and comparators 19b and 19c. By the way, in the absence of the means of detecting the sharpness of the chain, the switch 7d and resistances 8a and 9d will be formed the same as in the case of the embodiment shown in FIG. 2 so that the ON and OFF-signals of the switch 7d may be put directly into the interface.

According to the embodiment shown in FIG. 4 of the above-mentioned formation, for example, in confirming the fuel, when the user or the like 4 sets the switch 7a ON, if the required amount of the fuel is not actually contained, no completed confirmation signal will be put into the interface 13.

Therefore, though no fuel is actually contained, in case the user or the like 4 pushes the switch 7a by misconfirmation, a speech of "Put in the fuel" will continue to be issued from the speaker 15 to instruct the user or the like to confirm the fuel.

Therefore, in the case of the embodiment shown in FIG. 4, the confirmations of the operating conditions will not be judged to have been completed by only the user or the like and therefore the safety will be enhanced.

As detailed in the above, according to the present invention, before starting the operation of a chain saw or the like, the operating conditions are confirmed by the user or the like and, when the confirmation is failed, the operation of the chain saw or the like will be able to be prevented. Therefore, there is no fear that, during the operation, the internal combustion engine will seize or the chain will be removed to be dangerous. Thus, there is obtained an effect that the invention is very advantageous to the safety.

What is claimed is:

1. Apparatus for assuring the user inspection and verification of the proper operating conditions of motorized equipment comprising a completed confirmation means for confirming the completion by the user of the inspection and verification of the respective operating conditions, a confirmed state judging means receiving the output of the completed confirmation means for judging what operating conditions have been confirmed as completed, instructing means for informing the user of those operating conditions to be inspected and verified in response to the output of the confirmed state judging means, and motor control switching means receiving the output of the above mentioned confirmed state judging means for permitting the energization of the igniting circuit of the equipment only after the confirmation that inspection and verification or all the preset operating conditions were completed.

2. The apparatus according to claim 1 wherein said completed confirmation means comprises a nonlocked type switch operable by the user upon making the inspection and verification of the respective operating conditions.

3. The apparatus according to claim 1 wherein said completed confirmation means is a plurality of nonlocked type switches operable by the user upon making the inspection and verification of the respective operating conditions.

4. The apparatus according to claim 1 wherein said completed confirmation means comprises a plurality of nonlocked type switches corresponding to the number of respective operating conditions each operable by the user upon making the inspection and verification of the respective operating conditions, and means for automatically determining the existence of one or more of the respective operating conditions comprising sensors, comparators for receiving the output signals of said sensors and issuing output signals in the event the respective operating conditions are satisfied, and AND-gates operable upon receipt of the output signals from said respective switches and comparators.

5. The apparatus according to claim 1 wherein said confirmation instructing means comprises a speech synthesizing LSI and a speaker generating predetermined speeches responsive to the outputs of said speech synthesizing LSI.

6. The apparatus according to claim 1 wherein said confirmation instructing means is a lamp or liquid crystal indicator.

7. The apparatus according to claim 1 wherein said motor control switching means is a transistor.

8. The apparatus according to claim 1 wherein said motor control switching means is a thyristor.

9. The apparatus according to claim 1 wherein said motor control switching means is a relay.

* * * * *